United States Patent [19]

Rispeter et al.

[11] Patent Number: 4,966,270
[45] Date of Patent: Oct. 30, 1990

[54] HYDRAULICALLY OPERATED DOUBLE CLUTCH FOR A MOTOR VEHICLE

[75] Inventors: Siegfried Rispeter, Besigheim; Hubert Müller, Tiefenbronn; Rainer Wüst, Wiernsheim, all of Fed. Rep. of Germany

[73] Assignee: Dr. Ing. h.c.F. Porsche Aktiengesellschaft, Weissach, Fed. Rep. of Germany

[21] Appl. No.: 363,715

[22] Filed: Jun. 9, 1989

[30] Foreign Application Priority Data

Jun. 9, 1988 [DE] Fed. Rep. of Germany ....... 3819702

[51] Int. Cl.[5] ............................................. F16D 25/10
[52] U.S. Cl. ............................ 192/87.15; 192/85 AA
[58] Field of Search ............ 192/70.18, 70.21, 85 AA, 192/86, 87.11, 87.13, 87.15, 48.91

[56] References Cited

U.S. PATENT DOCUMENTS

| 2,567,703 | 9/1952 | Grandgirard | 192/87.13 |
| 2,750,017 | 6/1956 | Ahlen | 192/87.15 |
| 3,037,602 | 6/1962 | Clements . | |
| 3,157,057 | 11/1964 | Palmer et al. | 192/87.15 |
| 3,182,775 | 5/1965 | Schall | 192/87.15 |
| 3,384,214 | 5/1968 | Wilson . | |
| 4,312,434 | 1/1982 | Ballendux . | |
| 4,714,147 | 12/1987 | Szodfridt et al. | 192/87.15 |

FOREIGN PATENT DOCUMENTS

| 57599 | 8/1982 | European Pat. Off. | 192/85 AA |
| 1031063 | 5/1958 | Fed. Rep. of Germany . | |
| 3526630 | 2/1987 | Fed. Rep. of Germany . | |
| 809199 | 12/1936 | France | 192/87.15 |
| 1069725 | 7/1954 | France . | |
| 225841 | 5/1943 | Switzerland . | |
| 2108219 | 5/1983 | United Kingdom | 192/85 AA |
| 21915252 | 12/1987 | United Kingdom | 192/86 |

Primary Examiner—Rodney H. Bonck
Attorney, Agent, or Firm—Evenson, Wands, Edwards, Lenahan & McKeown

[57] ABSTRACT

A hydraulically operated double clutch for a motor vehicle is used for the alternating coupling of a central shaft and a hollow shaft, which is concentric to this central shaft, of a speed change gear with the clutch housing driven by the engine output shaft. Thus a gear shifting becomes possible without an interruption of the traction force. The clutch housing is composed of a left cover plate and a lateral plate, of a right cover plate and a lateral plate as well as of a casing part connecting them. At the junction planes between the left cover plate and the lateral plate as well as the right cover plate and the lateral plate, annular pistons are fitted in, which can be acted upon by hydraulic pressure and, by means of cylindrical pins, resting against them on the end face, operate the two disk bundles.

14 Claims, 7 Drawing Sheets

HYDRAULICALLY OPERATED DOUBLE CLUTCH FOR A MOTOR VEHICLE

BACKGROUND AND SUMMARY OF THE INVENTION

The invention relates to a hydraulically operated double clutch for a motor vehicle for the alternate coupling of a central shaft and of a hollow shaft which is concentric to this central shaft, of a speed change gear of a motor vehicle with the clutch housing driven by the engine output shaft the clutch includes at least one left clutch disk connected with the central shaft from one side and at least one right clutch disk connected with the central shaft from the other side, said at least one left and one right clutch disks being pressable against a center plate of the rotating clutch housing by means of annular pistons, these annular pistons being arranged concentrically with respect to the central shaft and being fitted in between a cover plate and a lateral plate of the clutch housing, which is screwed together with the cover plate.

This type of a double clutch is known from German Published Unexamined Application (DE-OS) 35 26 630. Two annular pistons, which are concentric with respect to one another and with respect to a central shaft, are fitted into a hydraulic plate composed of a cover plate and a base plate of the clutch housing which is screwed together with it. The annular pistons are penetrated by rods by means of which the two clutch disks are operated via pressure plates The rods of one annular piston are constructed as tension rods and, when acted upon by pressure, pull one clutch disk from one side against a center plate of the clutch housing The other clutch disk is pressed directly by means of the rods from the other side against the center plate. On the one side, the rods penetrate the annular pistons in the base plate and, on the other side, in the cover plate in a longitudinally movable and sealed off manner. For this purpose, the guide bores in the cover plate and in the base plate must be made very precisely and with narrow tolerances. The rods themselves represent turned parts which are machined at high cost.

It is an object of the invention to further develop a double clutch of this type in such a manner that less precise manufacturing tolerances will suffice and the double clutch can be manufactured at lower cost.

This object is achieved by constructing such a double clutch wherein one annular piston is fitted in at the junction plane between a left cover Plate and lateral plate, and the other annular piston being fitted in at a junction plane between a right cover plate and lateral plate of the clutch housing, and wherein the clutch disks with the annular pistons can be operated by means of several cylindrical pins which rest against their end faces and are guided in the lateral plates.

If, in accordance with certain preferred embodiments, instead of the rods, cylindrical pins are used which can be manufactured as mass-produced parts by means of continuous grinding, considerable costs are saved. Since the cylindrical pins are guided only in lateral plates of the clutch housing, these guide bores make only low demands on the tolerances, so that the manufacturing costs of the clutch are reduced further. The annular pistons and the flat cylindrical pins, which rest against them at the front face, may be arranged coaxially with respect to one another at both sides of the center plate or of the clutch disks to be pressed against it, and may be constructed as identical parts. The whole arrangement therefore becomes symmetrical with respect to the center plate and, when both clutches are operated, the same force-introducing conditions exist for both. Bundles of inner disks and outer disks which can be frictionally connected with the inner disks are preferably used as clutch disks. The disk bundles move in hydraulic fluid and form a wet clutch. Thus, possible sealing difficulties, which may occur in the case of a dry clutch, are eliminated Other objects, advantages and novel features of the present invention will become apparent from the following detailed description of the invention when considered in conjunction with the accompanying drawings.

DETAILED DESCRIPTION OF THE DRAWINGS

Figure 1:
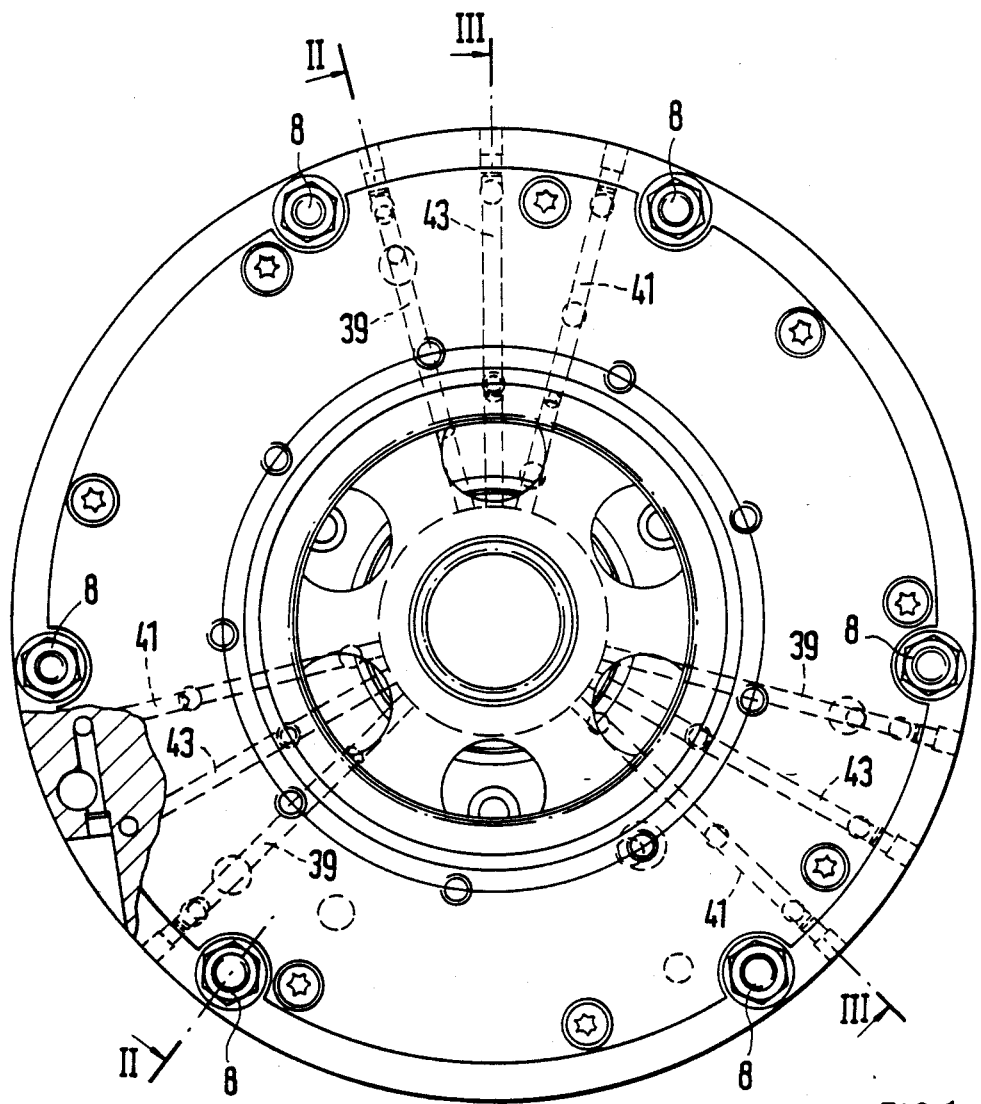
FIG. 1 is a lateral schematic view of the double clutch with hydraulic ducts, constructed in accordance with a preferred embodiment of the invention.

A hydraulically operable double clutch of a motor vehicle is enclosed by a cylindrical clutch housing 1. The clutch housing 1 is composed of a casing part 2 having a center plate, which projects radially toward the inside, a left lateral plate 4 which, on the front face, rests against the casing part 2, and a left cover plate 5, which is flanged to this lateral plate 4, as well as a right lateral plate 6 and a right cover plate 7 which is flanged to the right lateral plate 6 By means of six through bolts 8 distributed over the circumference as well as hexagon socket screws 9, 10, the casing part 2, the lateral plate 4, 6 and the cover plates 5, 7 are screwed together to form a compact clutch housing 1.

For the drive of the clutch housing 1, the left lateral plate 4 is provided with a plug toothing 12 which engages in a counter toothing 13 of the engine output shaft 14. Thus, it becomes possible to connect the double clutch to the engine in a completely assembled manner. On one side of the center plate 3, a left disk bundle 15 is disposed which consists of inner disks 16, outer disks 17 and a pressure plate 18; on the other side of the center plate 3, a right disk bundle 19 is disposed which consists of inner disks 20, outer disks 21 and a pressure plate 22. The inner disks 16 engage in a gear ring of a disk carrier 23 which, by means of a serration, is fastened on a central shaft 24. The inner disks 20 engage with a gear ring of a second disk carrier 25 which, by means of a serration, is fastened on a hollow shaft 26.

The outer disks 17 and 21 are connected with one another by means of tangential springs 27, two outer disks, in each case, by means of three tangential springs 27 distributed uniformly over the circumference, by means of rivets 28 or screws 29, being connected with one another and with the pressure plates The outer disks therefore can only carry out axial movements and are elastically spaced with respect to one another by means of the tangential springs 27.

The axial displacement path of the outer disks 17, 21 caused by the tangential springs 27 is limited by means of stepped stop pins 30 and 31 arranged on both sides at the disk bundles 15, 19. The stop pins 30, 31 are pressed into the left lateral plate 4 or the right lateral plate 6 and, with their stepped surfaces, rest against the tabs 32 which project radially at the outer edge of the outer disks 17, 21.

For the hydraulic operating of the disk bundles 15, 19, annular pistons 33 and 34 are guided in front-face ring grooves of the left cover plate 5 and of the right cover plate 7, these annular pistons 33 and 34, on the outside, being sealed off by piston rings 35 and, on the inside, by slotted sealing rings 36 of the cover plate 5 and 7. The annular pistons affect the pressure plates 18 and 22 by means of intermediate cylindrical pins 37.

Figure 2:
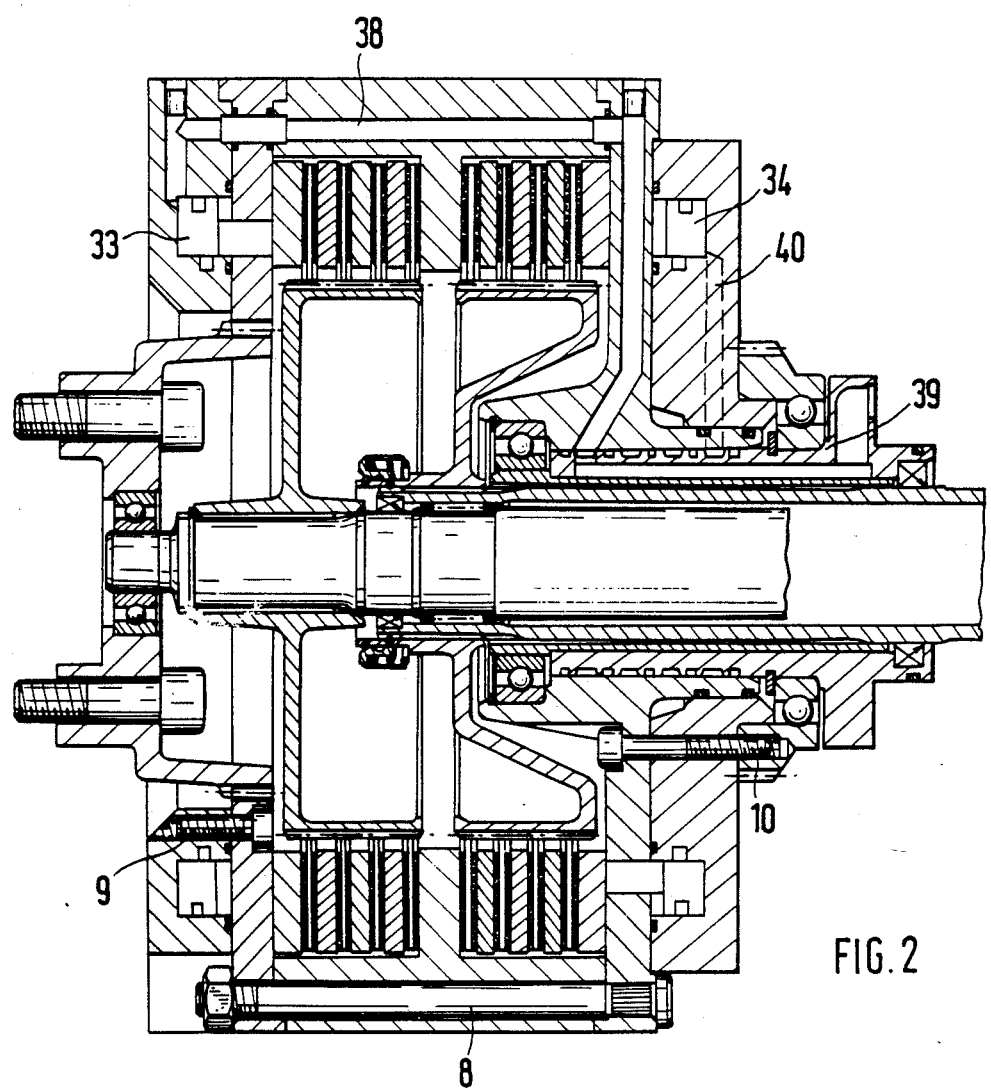
FIG. 2 is a longitudinal sectional view taken along Line II—II of FIG. 1.

As shown in FIG. 2, the annular piston 33 can be acted upon by hydraulic pressure by means of a pressure duct 38. The pressure duct 38 starts out from a ring duct of a stationary oil-carrying sleeve 39 which is concentric with respect to the hollow shaft 26. It is formed by a radial bore of the right lateral plate 6, a longitudinal bore through the casing part 2 of the clutch housing 1 and a radial bore of the left cover plate 5. A pressure duct 40 for the right annular piston 34 is shown by an interrupted line. It also starts out from a ring duct of the oil-carrying sleeve 39 and extends radially in the right cover plate 7.

Figure 3:
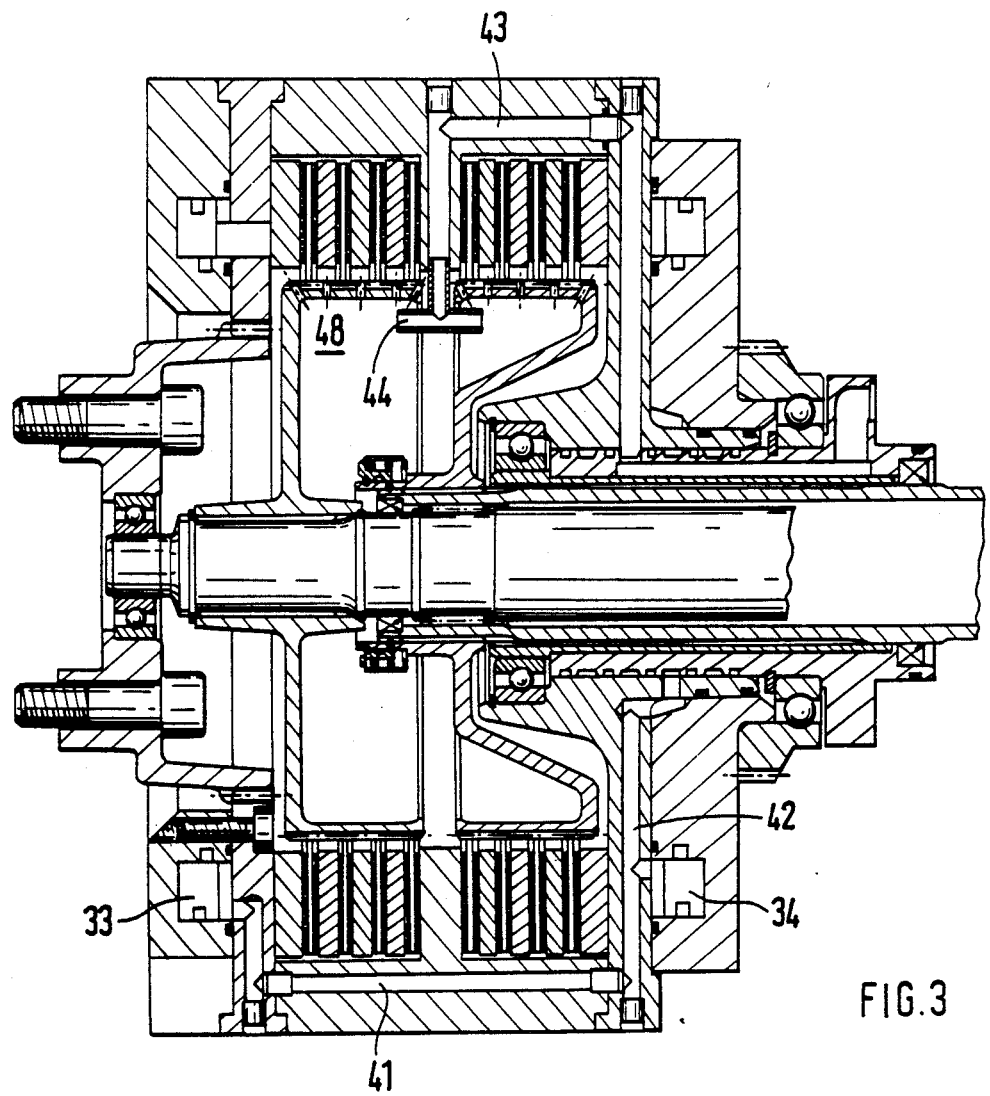
FIG. 3 is a longitudinal sectional view taken along Line III—III of FIG. 1.

An oil return line 41 from the left annular piston 33 to the oil-carrying sleeve 39 is shown in FIG. 3. The return line 42 of the right annular piston 34 is also connected to this return line 41. In the upper half of FIG. 3, a cooling duct 43 is shown which branches off the oil-carrying sleeve 39 and which extends radially through the right lateral plate 6, along the clutch housing 1, to the center plate 3 and ends in a T-piece 44 which is inserted into the center plate 3. If required, cooling oil is sprayed out of this T-piece 44 to the two disk carriers 23 and 25.

Figure 4:
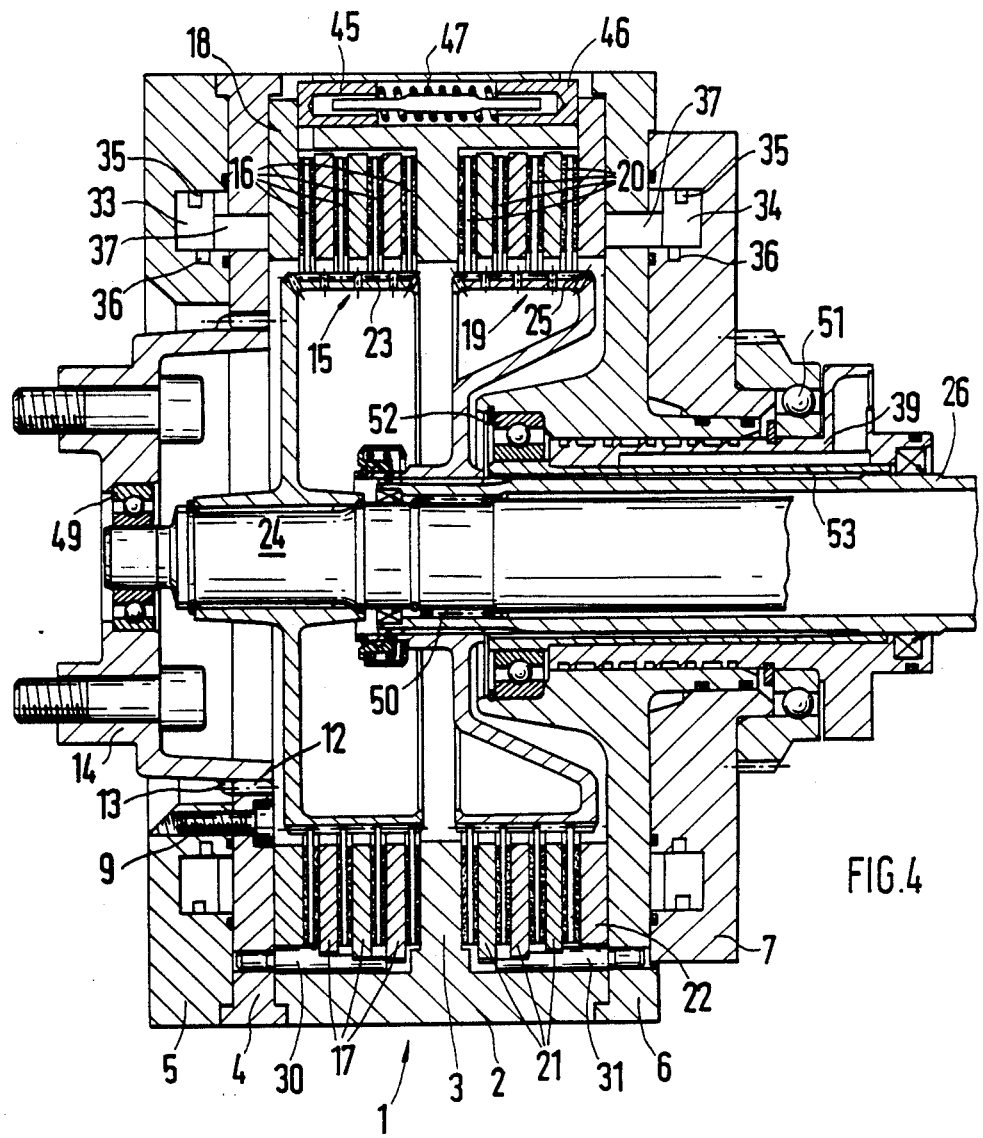
FIG. 4 is a longitudinal sectional view taken along Line IV—IV of FIG. 1.
Figure 5:
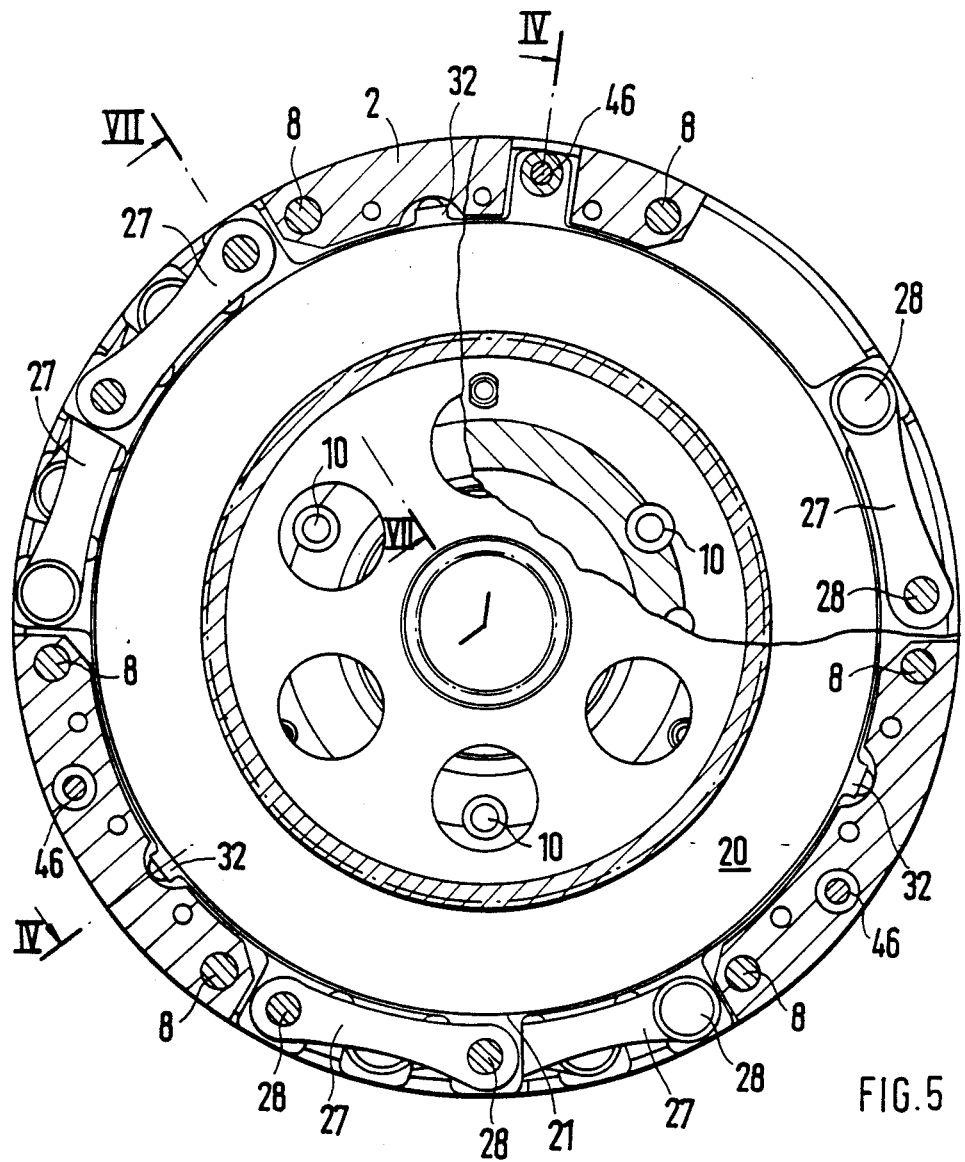
FIG. 5 is a cross-sectional view depicting an arrangement of tangential springs in the clutch of FIGS. 1–4.
Figure 6:
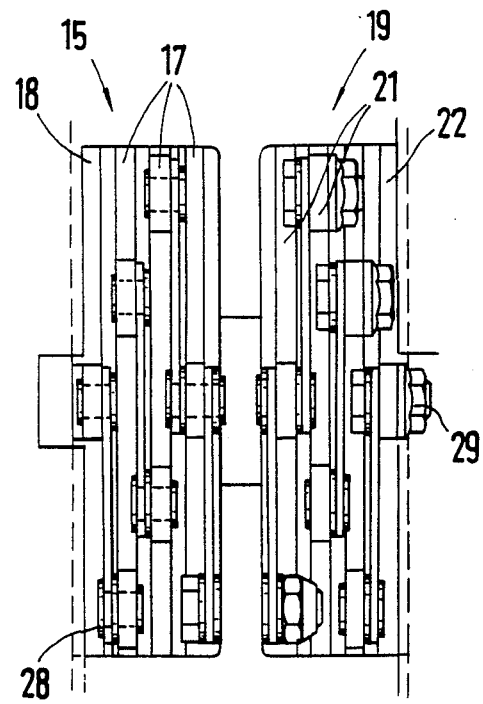
FIG. 6 is a top view of the tangential spring arrangement of FIG. 5.
Figure 7:
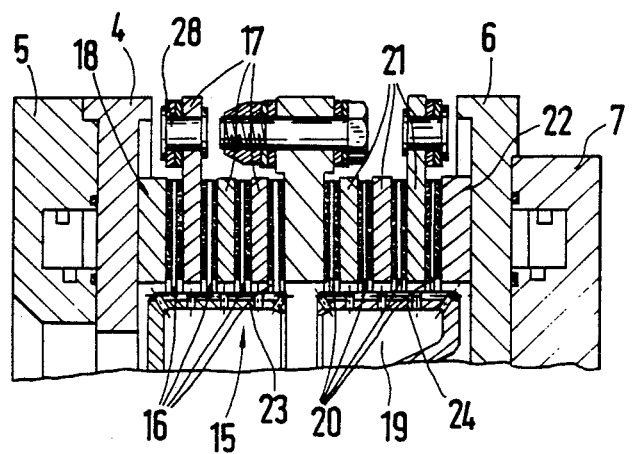
FIG. 7 is a partial view taken along Line VII—VII of FIG. 5.

Since the annular pistons 33, 34, contact cylindrical pins 37 on their facing (inwardly) sides and are open to fluid pressure throughout their non facing (outwardly) sides, a differential pressure effective surface area is created on the annular piston 33, 34. It is expedient to compensate the pressure forces exercised on the disk bundles 15, 19 caused by centrifugal forces. For this purpose, as shown in FIG. 4, restoring pistons 45, 46, which are coaxial with respect to one another, are longitudinally slidably fitted into casing part 2 of the clutch housing 1 and rest against the pressure plates 18, 22 under the prestress of a spring 47 disposed between them. The restoring pistons 45, 46 are connected to the return line 41 of the hydraulic oil and are acted upon by return pressure. The pressure-effective surfaces of the annular pistons 33, 34 and of the restoring pistons 45, 46 as well as their radial distances with resPect to the center longitudinal axis of the double clutch are selected and coordinated with one another such that the pressure forces exercised on the disk bundles 15, 19, which are caused by centrifugal force, are compensated.

In order to be able to have the hydraulic operation in a reproduceable way respond to commands of a control device, the hydraulic fluid must be free of air pockets. A venting takes place from the pressure side of the annular pistons 33, 34 through the radial slots of the sealing rings 36, to the return side of the annular pistons 33, 34 and from there into the return line 42. To this end the sealing rings are configured similar as piston rings with a break to define the radial slots. In this manner, air pockets at the high pressure faces (outwards) of the cylindrical pistons can escape through the slots into the vent line 42 (FIG. 3). In addition, air is removed at the cylindrical pins 37 in that these are disposed with a smaller dimension in the fitted bores of the left lateral plate 4 and the right lateral plate 6 and, by means of the effect of centrifugal force, with their top side, are placed against the fitted bores, so that a ring gap is created at their bottom side, through which the air pockets can escape into the open free clutch space 48 in which the disk carriers 23, 25 are arranged.

For bearing purposes, the central shaft 24, at the end face, is provided with a journal which is disposed in a ball bearing 49 of the engine output shaft 14. On the central shaft 24, the hollow shaft 26 is disposed in a needle bearing 50. The clutch housing 1, which is driven by the engine output shaft 14, is disposed on a ball bearing 51 of the stationary oil-carrying sleeve 39 and of another ball bearing 52, the inner race of which is fastened on a bearing sleeve 53 pressed into the oil-carrying sleeve 39.

Figure 8:
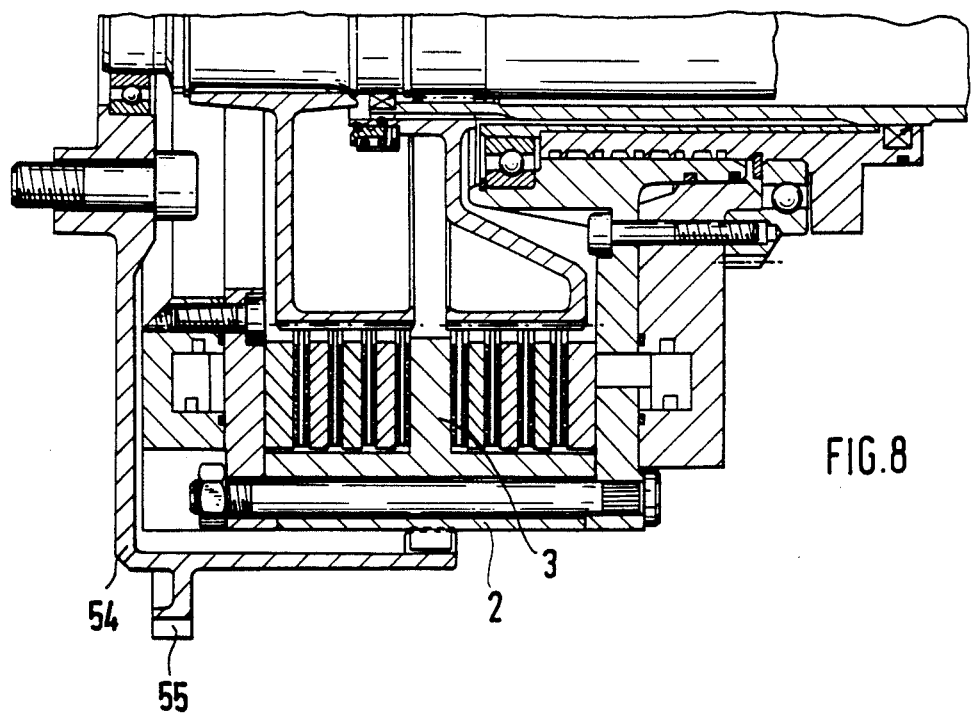
FIG. 8 is a partial schematic sectional view of another embodiment of the invention with a modified drive of the clutch housing.

In order to be able to introduce the engine torque directly into the clutch housing 1, according to FIG. 8, a driving bell 54 is fastened to the engine output shaft 14, this driving bell 54, by means of a toothing, engaging in a counter toothing of the casing part 2. A starting ring gear 55 is fastened to the driving bell 54.

Although the present invention has been described and illustrated in detail, it is to be clearly understood that the same is by way of illustration and example only, and is not to be taken by way of limitation The spirit and scope of the present invention are to be limited only by the terms of the appended claims.

What is claimed is:

1. A hydraulically operated double clutch, for the alternate coupling of a central shaft and of a hollow shaft, which is concentric to this central shaft, of a speed change gear of a motor vehicle with a clutch housing driven by an engine output shaft, comprising at least one left clutch disk connected with the central shaft and located at one side of the hydraulically operated double clutch, at least one right clutch disk connected with the hollow shaft and located at the right side of the hydraulically operated double clutch, said at least one left and one right clutch disks being alternatively pressable against a center plate of the rotating clutch housing by means of annular pistons, these annular pistons being arranged concentrically with respect to the central shaft and being fitted in between a cover plate and a lateral plate of the clutch housing, which lateral plates are screwed together with a respective one of the cover plates, wherein one said annular piston is fitted in at a plane between a left cover plate of said cover plates and a respective lateral plate of said lateral plates, and the other said annular piston is fitted in at a plane between a right cover plate of said cover plates and a respective lateral plate of said lateral plates of the clutch housing, and wherein the clutch disks with the annular pistons can be operated by several cylindrical pins which rest against end faces of the clutch disks and which pins are guided in the lateral plates.

2. A double clutch according to claim 1, wherein the diameter of a cylindrical pins is smaller than the radial thickness of the annular pistons.

3. A double clutch according to claim 1, wherein a disk bundle is arranged on the left of the center plate consisting of inner disks and outer disks, wherein a disk bundle is arranged on the right of the center plate, consisting of inner disks and outer disks, all outer disks being connected with a casing part of the clutch housing, the left inner disks being connected with the central shaft by means of a disk carrier, the right inner disks being non-rotatably connected by means of a disk carrier with respect to the hollow shaft.

4. A double clutch according to claim 3, wherein the outer disks are actuated through pressure plates and are connected with one another by means of tangential springs and, in a torque-transmitting manner, with the clutch housing, the tangential springs spacing the outer disks with respect to one another when the hydraulic pressure is lowered.

5. A double clutch according to claim 3, wherein the cylindrical pins affect the bundles of disks by respectively contacting one side of a pair of pressure plates, which are connected by tangential springs, and wherein restoring pistons rest against another side of the pressure plates, and these restoring pistons are supported by a spring arranged between them.

6. A double clutch according to claim 5, wherein the restoring pistons are connected to a return line of the hydraulic oil branching off the annular pistons, and, in this manner, can be acted upon by return flow pressure.

7. A double clutch according to claim 6, wherein the pressure-effective surface of the annular pistons and of the restoring pistons as well as their radial distances with respect to the center longitudinal axis of the double clutch are coordinated with one another in such a manner that the pressure forces exercised on the disk bundles by centrifugal force are compensated.

8. A double clutch according to claim 5, wherein each of the annular pistons, each of the restoring pistons and each of the cylindrical pins are identical with respect to shape and size with each of the annular pistons, restoring piston and cylindrical pins, respectively.

9. A double clutch according to claim 6, wherein, for the sealing-off of the annular pistons, outer and inner radially slotted piston rings are used, via the radial slots of which, air pockets in the hydraulic oil may escape to the return line.

10. A double clutch according to claim 6, wherein the return lines starting out from the left annular piston and the right annular piston are connected with one another.

11. A double clutch according to claim 2, wherein the outer disks are held against stepped stop pins fastened in the clutch housing by means of the tangential springs at their outer edge.

12. A double clutch according to claim 1, wherein the center plate contains a cooling duct connected to a hydraulic oil supply, hydraulic oil from this cooling duct being sprayed for cooling between the disk bundles located on both sides of the center plate.

13. A double clutch according to claim 1, wherein the clutch housing can be connected with the engine output shaft in a torque-transmitting manner by means of a plug toothing.

14. A double clutch according to claim 13, wherein, at the engine output shaft, a driving bell is fastened which is connected to the center plate of the clutch housing in a torque-transmitting manner, and in that a starting ring gear is fastened to the driving bell.

* * * * *